(12) United States Patent
Matsui

(10) Patent No.: US 6,640,989 B2
(45) Date of Patent: Nov. 4, 2003

(54) COMPOSITE CONTAINER WITH INTEGRAL SUPPORT, RELATED METHOD AND MOLD

(75) Inventor: Yutaka Matsui, Bardstown, KY (US)

(73) Assignee: Inoac Packaging Group Inc., Bardstown, KY (US)

( * ) Notice: Subject to any disclaimer, the term of this patent is extended or adjusted under 35 U.S.C. 154(b) by 0 days.

(21) Appl. No.: 09/779,260

(22) Filed: Feb. 8, 2001

(65) Prior Publication Data

US 2002/0104819 A1 Aug. 8, 2002

(51) Int. Cl.[7] .............................................. B65D 90/12
(52) U.S. Cl. ........................................ 215/377; 220/605
(58) Field of Search ................................ 215/377, 376, 215/372, 373, 374; 220/600, 628, 613, 630–638, 602, 605, 606, 610; 65/42, 54, 57, 56, 64, 214, 266, 256

(56) References Cited

U.S. PATENT DOCUMENTS

| | | | | |
|---|---|---|---|---|
| 83,341 | A | * 10/1868 | Towndrow | ................... 215/377 |
| 131,141 | A | * 9/1872 | Will | ........................... 215/377 |
| 181,013 | A | * 8/1876 | Sawyer | ....................... 220/635 |
| 195,337 | A | * 9/1877 | Braunstein | .................. 215/377 |
| 439,447 | A | * 10/1890 | Ulfig | ........................... 403/343 |
| 600,427 | A | * 3/1898 | Jones, Jr. | ..................... 215/377 |
| 782,710 | A | * 2/1905 | Weller | ......................... 215/377 |
| 2,120,862 | A | * 6/1938 | Heller | .......................... 215/377 |
| 2,169,426 | A | * 8/1939 | Morton | ....................... 215/12.1 |
| 2,664,004 | A | * 12/1953 | Forman et al. | ............. 215/377 |
| 2,837,245 | A | 6/1958 | Grebowiec | |
| 3,045,855 | A | * 7/1962 | Lipman | ....................... 215/377 |
| 3,297,289 | A | * 1/1967 | Raus | ........................... 206/423 |
| 3,393,819 | A | * 7/1968 | Walle et al. | ............. 156/275.5 |
| 3,468,443 | A | 9/1969 | Marcus | |
| 3,482,731 | A | * 12/1969 | Douty | ......................... 215/377 |
| 3,722,725 | A | 3/1973 | Khetani et al. | |
| 3,838,789 | A | 10/1974 | Cvacho | |
| 3,960,474 | A | 6/1976 | Kader | |
| 4,127,211 | A | * 11/1978 | Zerbey | ........................ 220/212 |
| 4,140,236 | A | 2/1979 | Uhlig et al. | |
| 4,298,567 | A | 11/1981 | Aoki | |
| 4,326,638 | A | 4/1982 | Nickel et al. | |
| 4,463,860 | A | 8/1984 | Yoshino et al. | |
| 4,552,275 | A | 11/1985 | Chang et al. | |
| 4,575,915 | A | 3/1986 | Clark et al. | |
| D283,288 | S | * 4/1986 | Durand | ......................... D7/13 |
| 4,850,493 | A | 7/1989 | Howard, Jr. | |
| 4,850,494 | A | 7/1989 | Howard, Jr. | |
| 4,955,491 | A | 9/1990 | Marshall et al. | |
| 4,955,492 | A | 9/1990 | Behm et al. | |
| 4,959,006 | A | 9/1990 | Feddersen et al. | |
| 4,981,736 | A | 1/1991 | Feddersen et al. | |
| 5,024,340 | A | 6/1991 | Alberghini et al. | |
| 5,047,271 | A | 9/1991 | Feddersen et al. | |
| 5,062,537 | A | 11/1991 | Hayashi | |
| 5,205,423 | A | 4/1993 | Ota | |
| 5,287,979 | A | * 2/1994 | Bourgeois | ................... 220/4.21 |

(List continued on next page.)

FOREIGN PATENT DOCUMENTS

EP 012009 * 6/1980 .................. 215/377

Primary Examiner—Stephen K. Cronin
Assistant Examiner—Lien Ngo
(74) Attorney, Agent, or Firm—King & Schickli, PLLC

(57) ABSTRACT

A composite container with an integral support, as well as a mold and method for forming such a container, are disclosed. The support may include a first end having a plurality of radially extending slits communicating with a central bore. Hence, when the support is placed in or adjacent to the mold cavity during a blow molding process, a portion of the parison or preform undergoing blow molding penetrates into in at least one, are preferably each of the slits and the bore to form a secure connection. A second end of the support may include a leg for mating with a base. The base may be integrally formed with the leg, or may be separately attached after the blow molding process is complete.

18 Claims, 7 Drawing Sheets

U.S. PATENT DOCUMENTS

| | | |
|---|---|---|
| 5,344,036 A | 9/1994 | Stanescu et al. |
| 5,400,911 A | 3/1995 | Mahajan |
| 5,503,283 A | 4/1996 | Semersky |
| 5,611,988 A | 3/1997 | Mahajan |
| 5,664,695 A | 9/1997 | Young et al. |
| 5,685,446 A | 11/1997 | Young et al. |
| 5,785,197 A | 7/1998 | Slat |
| 5,850,931 A | 12/1998 | Young et al. |
| 5,874,141 A | 2/1999 | Matsui |
| 5,894,944 A * | 4/1999 | Swift .......................... 211/78 |
| 6,045,001 A | 4/2000 | Seul |
| 6,051,295 A | 4/2000 | Schloss et al. |
| 6,105,814 A * | 8/2000 | Chen .......................... 220/625 |
| 6,439,418 B1 * | 8/2002 | Immerman et al. ......... 220/630 |

\* cited by examiner

FIG. 1A
FIG. 1B
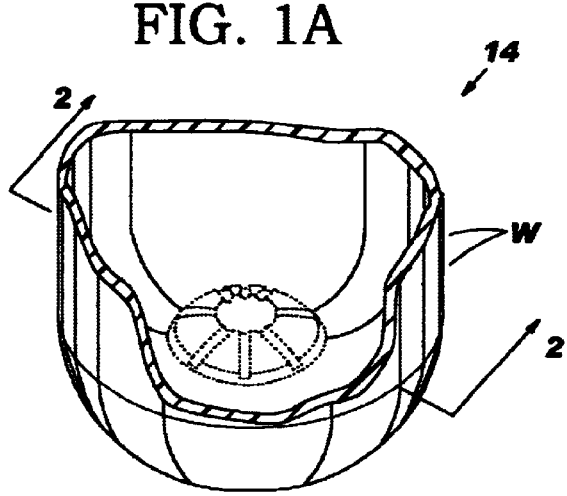
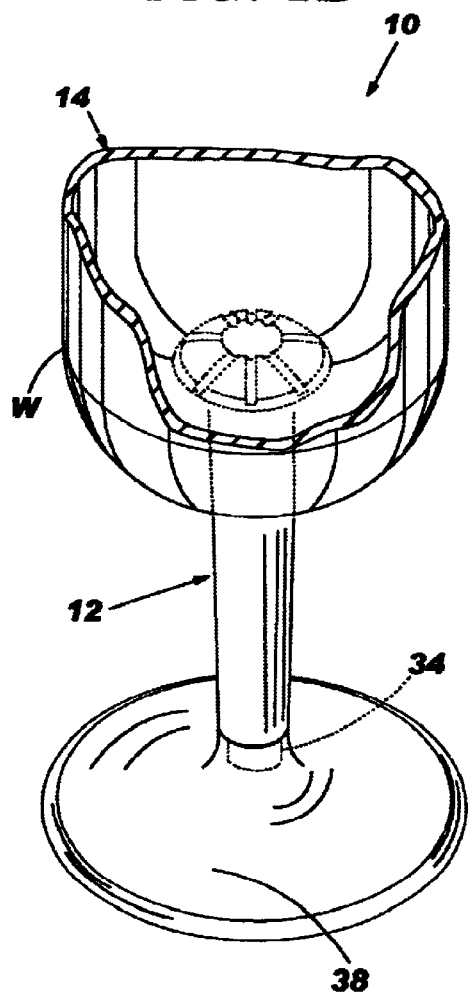

COMPOSITE CONTAINER WITH INTEGRAL SUPPORT, RELATED METHOD AND MOLD

TECHNICAL FIELD

The present invention is directed to the decorative container art and, more particularly, to a composite container comprised of a blow molded body and an integral support, a related method of forming such a container, and a mold for use in forming the container using a blow molding process.

BACKGROUND OF THE INVENTION

The use of plastic containers continues to grow in the consumer market at a rapid rate and promises to continue in years to come. In many marketing areas, such as for liquid or semi-liquid (viscous) cosmetics and related products, the plastic container, such as a bottle or jar, is by far the container of choice. A plastic container is not only non-breakable, but can be molded into different shapes so as to be very attractive, as well as functional. In addition, from a cost standpoint, the use of plastic is very competitive with the other materials often used to form containers, such as glass.

One of the most popular containers used for cosmetics, as well as other liquid and semi-liquid products, is the blow molded bottle or jar. Usually, the containers are fabricated of a clear, translucent or opaque plastic material. For example, polyethylene terephthalate (PET) with additives for varying light transmission and/or color is used to form most types of cosmetic containers. Of course, other materials can also be chosen depending on various factors, such as the type of product container, the desired size or shape of the container, the expected or required service life, any recycling/environmental considerations, or inherent cost constraints.

In addition to merely containing product, the container should be aesthetically pleasing, since the appearance may influence the customer's purchasing decision. As noted above, the attractiveness of the container may be enhanced by forming it having a distinctive or irregular shape, as well as by using eye-catching colors and possibly with intricate surface patterns or designs. Many different types of containers embodying some or all of these features have been proposed in the past. However, in the case of the popular blow molded containers, the range of shapes available are somewhat limited by the nature of the blow molding process. For example, using a conventional tubular preform or parison alone, it is generally difficult, if not impossible, to blow a unitary, self-supporting container that simulates the appearance of the wide base and slender stem portions typically found on a conventional wine glass. Hence, a need is identified in the art for a novel container having this desirable appearance formed using inexpensive and highly efficient blow molding techniques.

SUMMARY OF THE INVENTION

The present invention comprises: (1) a composite container formed using a blow molding process having an integral support or stand that is aesthetically pleasing and provides with an added dimension of functionality not found in prior art containers with integral base members that merely structurally enhance the corresponding container; (2) a related method for forming a container with an integral support or stand; and (3) a mold for use in forming such a container.

In accordance with a first aspect of the invention, a composite container formed using a blow molding process is disclosed. The container comprises a hollow body formed by the blow molding process and a support having a first end with a plurality of slits. At least one of the slits at least partially receives a first portion of the body during the blow molding process. A second end of the support engages a support structure, such as a non-integral base or a stable surface.

In one embodiment, the first end of the support includes a generally planar surface in which at least a portion of each of the plurality of slits is formed. Preferably, this first end of the support is generally frusto-conical and includes a peripheral sidewall having a ledge that engages a second portion of the blow molded body. This second portion blouses over the peripheral sidewall and ledge as a result of the blow molding process, which creates a substantially uninterrupted transition from the support to the body of the resulting container. Each of the plurality of slits may extend radially from a common center in the first end of the support. The first end of the support may also include a peripheral sidewall adjacent to the ledge, with the slits extending from adjacent a center of the first end of the support through the peripheral sidewall.

The first end of the support may also include a bore located substantially in the center of the radially extending slits. Hence, during the blow molding process, the bore also receives at least a portion of the body. In one embodiment, the bore has an opening that is smaller in cross section than a base portion of the bore. Accordingly, the sidewall of the bore is tapered to form an undercut that captures the portion of the blow molded body received therein.

The support may include a leg having a plug. In that case, the support structure is a base having a socket for receiving the plug such that the resulting assembly is capable of self-support. Alternatively, as noted above, the base may be integrally formed with the leg, in which case neither the plug/socket arrangement nor the separate attachment step is required.

In accordance with a second aspect of the invention, a self-supporting composite container formed using a blow molding process is disclosed. The container comprises a hollow body formed during the blow molding process and a support. The support includes a first end for engaging a portion of the blow molded body and a second end having a leg. At least one base is provided for mating with the leg to support the body above a stable structure.

In one embodiment, the first end of the support includes a plurality of openings. During the blow molding process, a plurality of portions of the body penetrate into these openings. The openings may be in the form of grooves, slots, notches, furrows, channels, combinations thereof, or any other type of narrow, elongated openings, but are preferably radially extending slits. The slits communicate at a first end thereof with a central bore and at the opposite end thereof with a peripheral sidewall formed in the first end of the support. Preferably, the first end of the support is frusto-conical and includes an planar surface and a peripheral ledge for engaging a portion of the blow molded body blousing over the planar surface during the blow molding process. Also, the base may be integrally formed with the leg.

In accordance with a third aspect of the invention, a method for producing a self-supporting composite container using a blow molding process is disclosed. The method comprises positioning a support having a first end including a plurality of slits in or adjacent to a mold cavity and blow molding a parison or preform in the mold cavity and over the support such that at least a portion thereof is received in one or more of the plurality of slits. The engagement between at least a portion of the parison or preform and the one or more slits in the support creates a secure connection.

In one embodiment, the support further includes a second end having at least one leg, and the method further comprises attaching a base to the leg such that the base supports the composite container on a stable support structure. The mold cavity may further comprise a plurality of mold portions for closing over the preform. At least one of the portions includes a receiver for receiving the leg of the integral support during the blow molding process and holding the support adjacent to the mold cavity. The method may further include placing the leg of the support in the opening prior to blow molding the parison or preform in the mold cavity. Also, the step of blow molding may involve stretch blow molding a preform in the mold cavity using a stretch rod, whereby a bottom portion of the preform is forced into engagement with the first end of the support by the stretch rod.

In accordance with a fourth aspect of the invention, a mold for forming a composite article from a blow molded parison or preform with an integral support having a first end for engaging the parison or preform and a second end including a leg is disclosed. The mold comprises a plurality of mold portions for closing over the preform to create a mold cavity. One of the portions includes a receiver for receiving the leg on the second end of the support during the blow molding process and holding the first end in or adjacent to the mold cavity. Hence, upon blow molding, the parison or preform expands in and fills the mold cavity as the result of biaxial stretching such that at least a portion thereof attaches to the first end of the support. In one possible embodiment, the support includes an integral base connected to the leg, and the receiver is adapted for receiving both the leg and the integral base. In this case, the blow-molded article is capable of self-support in a stable fashion immediately upon being removed from the mold.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1a is a partially cutaway, exploded perspective view of one embodiment of the container of the present invention, including the blow molded body, integral support, and a separate base;

FIG. 1b is a partially cutaway perspective view of the container of FIG. 1;

FIG. 2 is an enlarged partially cutaway, cross-sectional side view of the blow molded body forming a part of the container taken along line 2—2 of FIG. 1a;

DETAILED DESCRIPTION OF THE PREFERRED EMBODIMENTS

Figure 1:
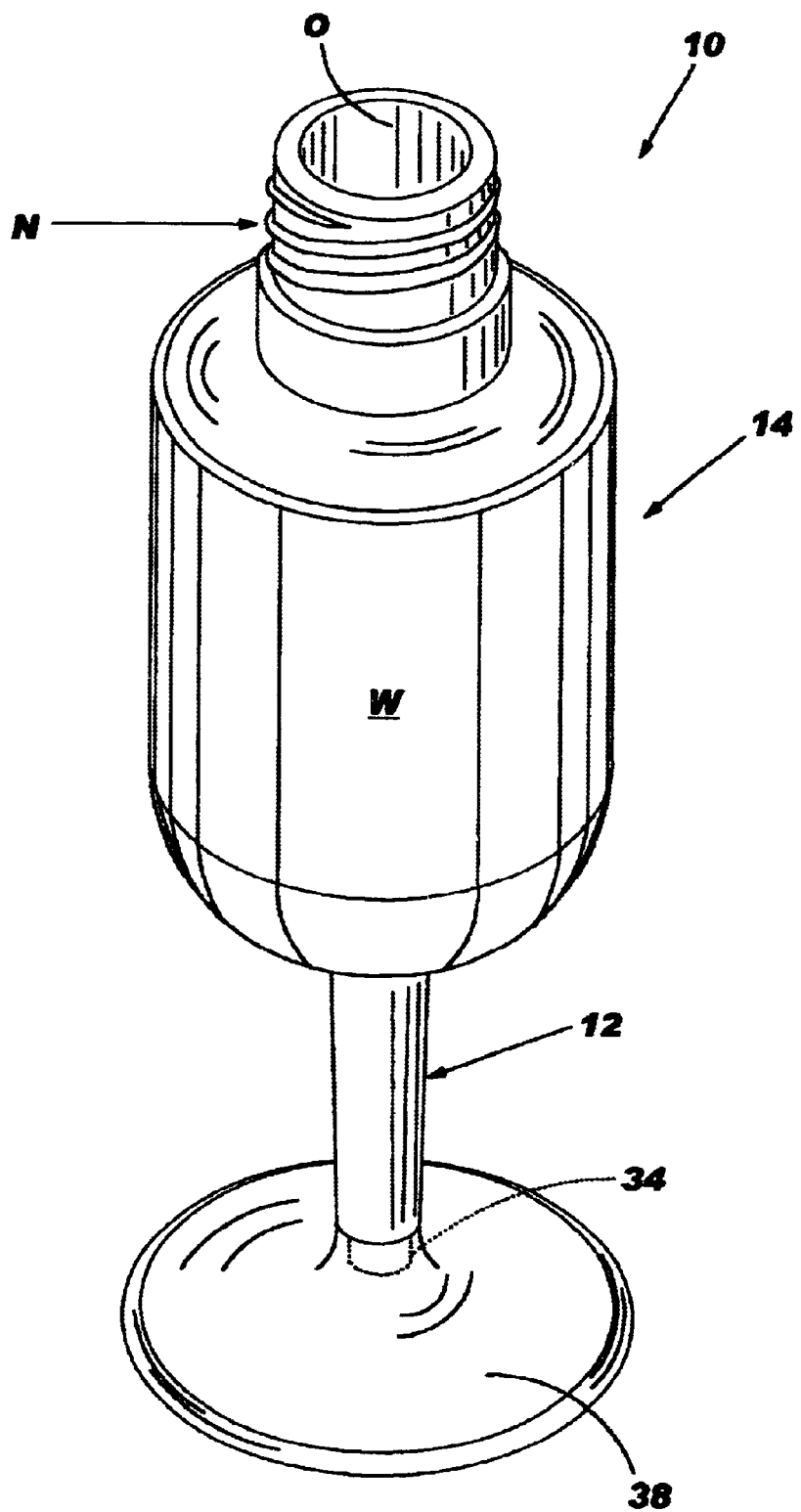
FIG. 1 is an overall perspective view of one possible embodiment of the composite container in its completed form.
Figure 5A:
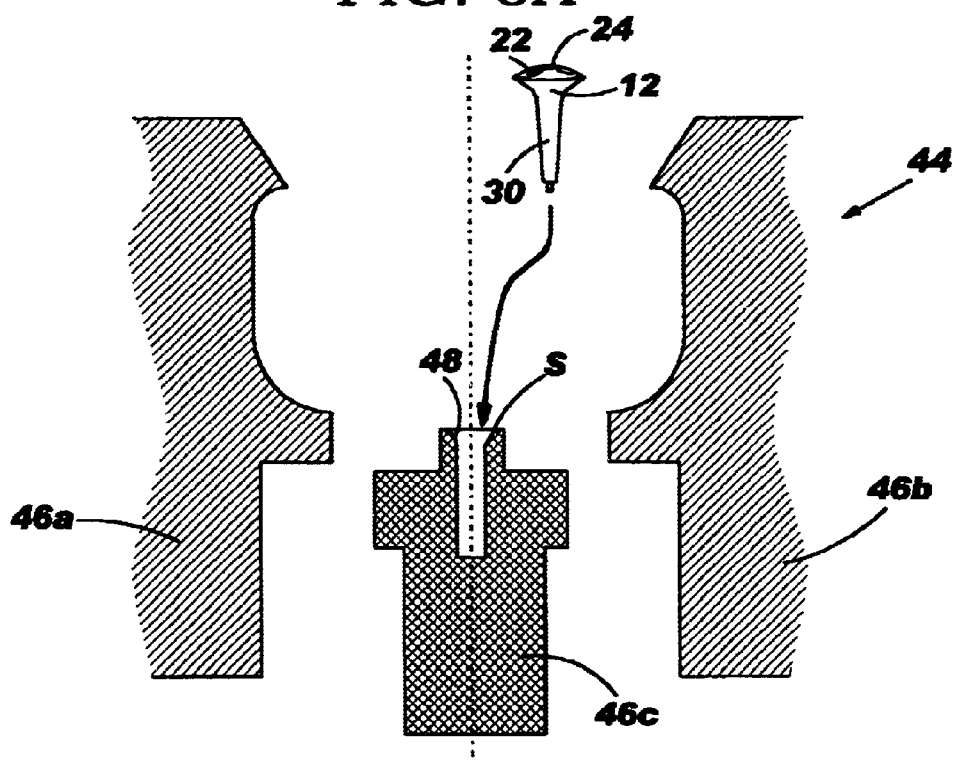
FIGS. 5a–5d schematically illustrate one possible embodiment of the mold and the process used to form the container with an integral support.

With reference now to FIG. 1 of the drawings, a container 10 with an integral support 12 is shown in its completed form. The container 10 includes a hollow body 14 that is formed by blow molding a parison or preform, as described further below and shown in FIGS. 5a–5c. The hollow body 14 is shown in the form of a bottle having a neck N (which is typically threaded for receiving a cap, which may include a dispensing opening or other dispensing means) defining an opening O and an outer wall W (see FIG. 6). As mentioned above, the parison or preform, and hence the body 14 may be formed of polyethylene terephthalate (PET) or other rigid or semi-rigid plastic materials, possibly with additives for varying light transmission, color, or other characteristics. Of course, other like materials may also be used to form the body 14, depending on, among other things, the size and shape desired, inherent cost limitations, the required service life, and the particular type and amount of product being contained (liquid, semi-liquid, or even dry).

Figure 3:
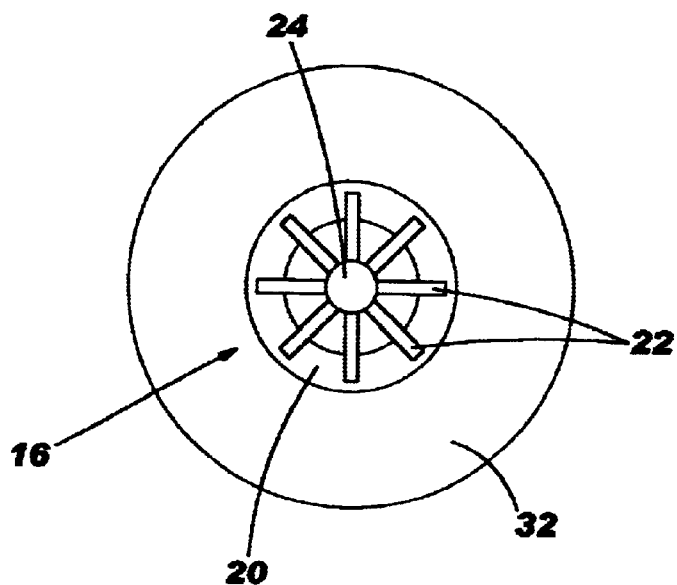
FIG. 3 is a top view looking down on the first end of the support.

Turning to FIG. 1a specifically, the structure of one possible version of the support 12 is illustrated and will now be described in detail. In this embodiment, the support 12 includes a first end 16 with a generally planar upper surface and a peripheral sidewall 18. Preferably, the first end 16 is substantially circular and the sidewall 18 is tapered or frusto-conical in the horizontal dimension and includes a peripheral ledge 20, the function of which is outlined in more detail in the description that follows. A plurality of openings, such as slits 22, are at least partially formed in the upper surface of the first end 16. These openings or slits 22 may extend radially from a common center, and may be in communication at a first end with a bore 24 or opening formed in the first end 16 (see FIG. 3). The opposite end of each slot 22 may extend through the peripheral sidewall 18, adjacent to the ledge 20. Additionally, the inner wall defining the bore 24 may be narrower in cross-section at the opening than at the bottom wall (note FIG. 1c and dimensions "a" and "b" in FIG. 4, which for purposes of illustration only are shown as representing a circular bore 24 having diameters of about 5 and 7 millimeters, respectively). As should be appreciated, this provides the bore 24 with an undercut, the function of which is also described in more detail below.

Figure 2:
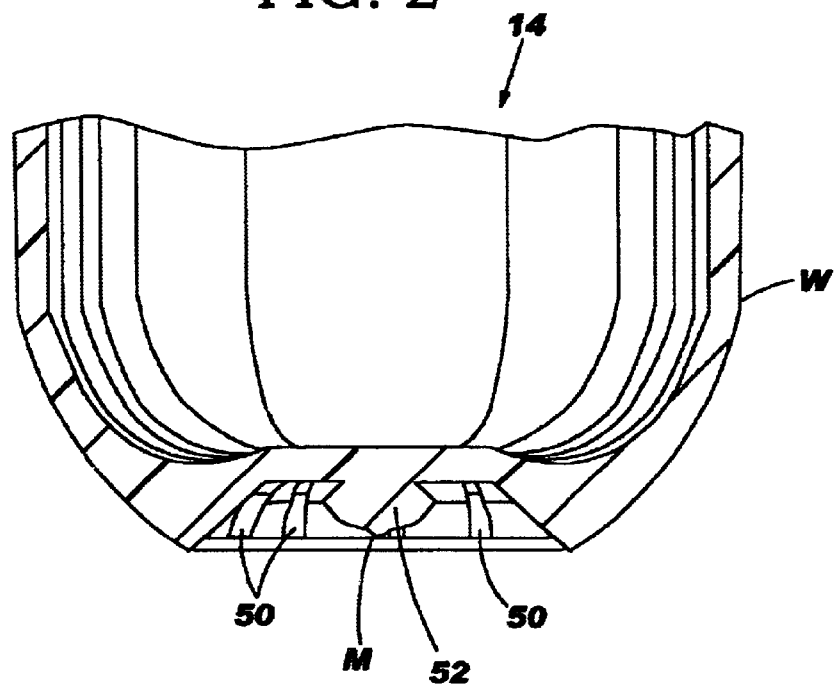
Figure 4:
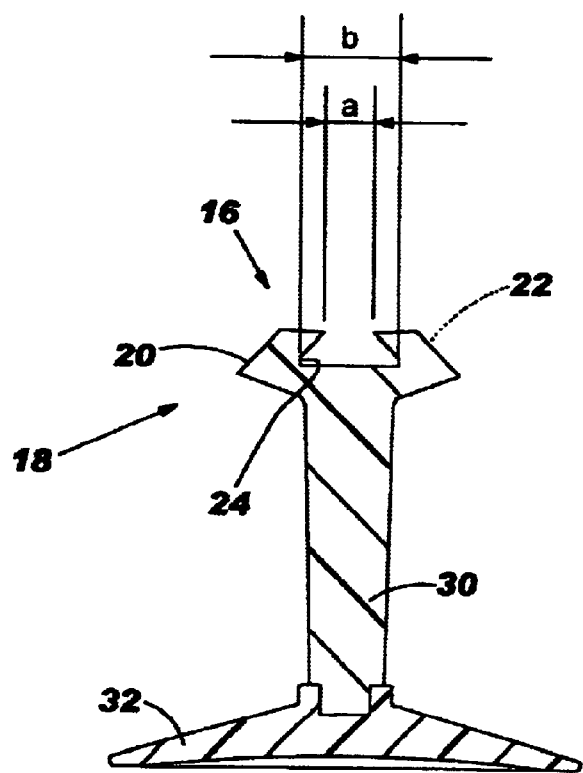
FIG. 4 is a cross-sectional side view of a support having an integral base, illustrating in particular the tapered inner wall of the bore forming an undercut for capturing a portion of the blow molded body.

The support 12 also includes a leg 30. As perhaps best understood with reference to FIG. 1c, the leg 30 may extend from the underside of the first end 16 and may be of any desired cross-sectional shape and size. As shown in FIGS. 4 and 7 and described in more detail below, the leg 30 may include an integral base 32, or instead may include a plug 34 at the terminal end. In the illustrated embodiment, the plug 34 is formed by an undercut in the leg 30 and is sized for mating with a socket 36 in a non-integral base 38 that is separately attached (see FIGS. 2 and 6). In either case, the base 32 or 38 is capable of fully holding the support 12, and hence the container 10, in an upright fashion from a stable structure, such as a table or other flat surface, when assembled. The support 12 is preferably formed using an injection molding process, and may be fabricated of plastic, glass, metal, or any other suitable material capable of providing the necessary support, without regard to the forming process used. The non-integral base 38 may be fabricated of similar materials and formed using a injection molding process, if desired.

With reference now to FIGS. 5a–5d, one exemplary method of forming the container 10 with the integral support 12 from a preform 40 using a stretch blow molding technique is now described in detail. The mold cavity 42 is defined by a mold 44 having a plurality of portions, including first and second side portions 46a, 46b and a bottom portion 46c. An upper portion 46d is also provided (see FIG. 5b), which usually carries the preform 40 and includes an opening for receiving structures, such as the blow core and stretch rod (see FIG. 5c). As should be appreciated, each of these portions 46a–46d are connected to one or more motive devices (not shown), such as pneumatically/hydraulically driven linear actuators (not shown), and hence are capable of moving towards each other to create the mold cavity 42 around the preform 40, and then away from each other to allow for retrieval of the molded article once the combined blowing and/or stretching operation is complete.

One portion of the mold 46a–46d, and preferably the lower portion 46c, includes a receiver 48. This receiver 48 is slightly oversized and otherwise adapted for receiving at least a portion of the leg 30 of the support 12 and holding the first end 16 such that it is in or adjacent to the mold cavity 42. As perhaps best shown in FIG. 5b, the receiver 48 may also include a tapered upper seating surface S that is annular in shape. This annular seating surface S serves as a resting point for the corresponding underside of the support 12 when the leg 30 is inserted in the receiver 48.

Once the support 12 is in place, the preform 40 is positioned in or adjacent to the mold 44. In the conventional molding operation, the upper portion 46d of the mold 44 is capable of receiving and holding the neck N of the preform 40 (which does not stretch and thus forms the neck N of the resulting container 10, see FIG. 6). The preform 40 is formed using a well-known injection molding technique that is either performed separately from the blow molding process using a different injection molding apparatus or using the same apparatus, but an injection mold "stage," immediately prior to the blow molding "stage" (in other words, a "two-stage" process; note in FIG. 5b the contour of the upper portion 46d of the mold for defining the "lip cavity" and threaded neck N of the preform 40 formed during the injection molding stage). In that case, the opening in the upper portion 46d is also adapted for receiving the injection core (not shown) that also serves to define the upper peripheral ledge, the inner wall of the neck N, and the interior surface of the preform 40. Detailed descriptions of advanced, multi-stage injection and blow molding processes can be found in Nissei ASB's U.S. Pat. No. 5,102,610 to Koga, as well as the various references cited therein, the disclosures of which are incorporated herein by reference. In the case where conventional gating techniques are used, it should be appreciated that the preform 40 usually includes a gate mark M or vestige of the sprue or runner resulting at the transition from the hot injection material to the injection mold, once cooled (see FIG. 5b).

Figure 5B:
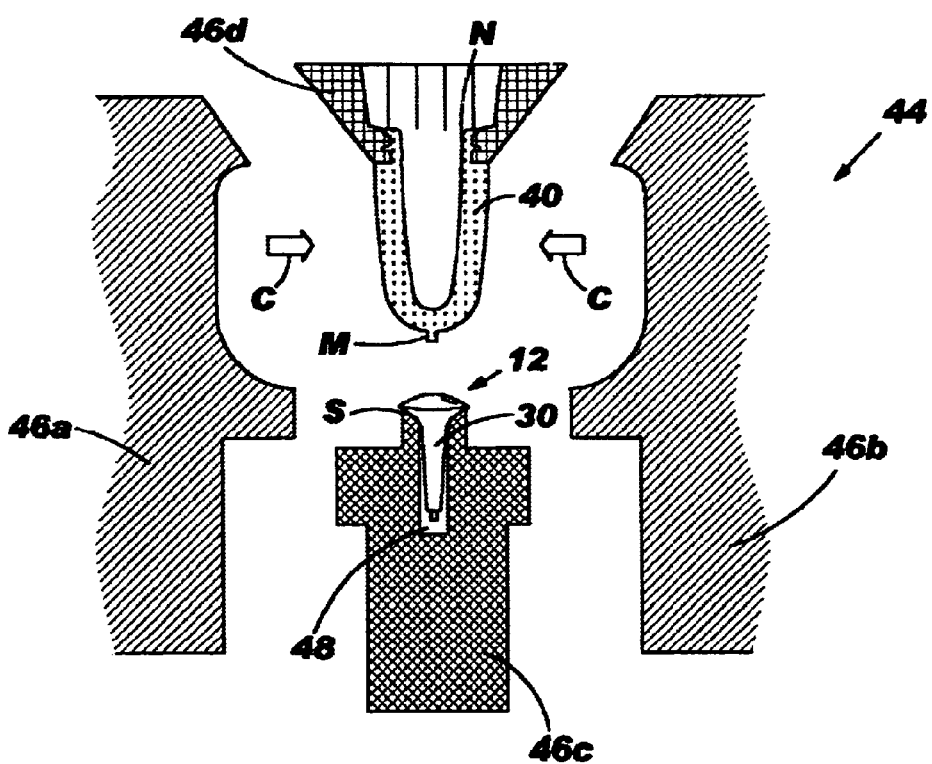
Figure 5C:
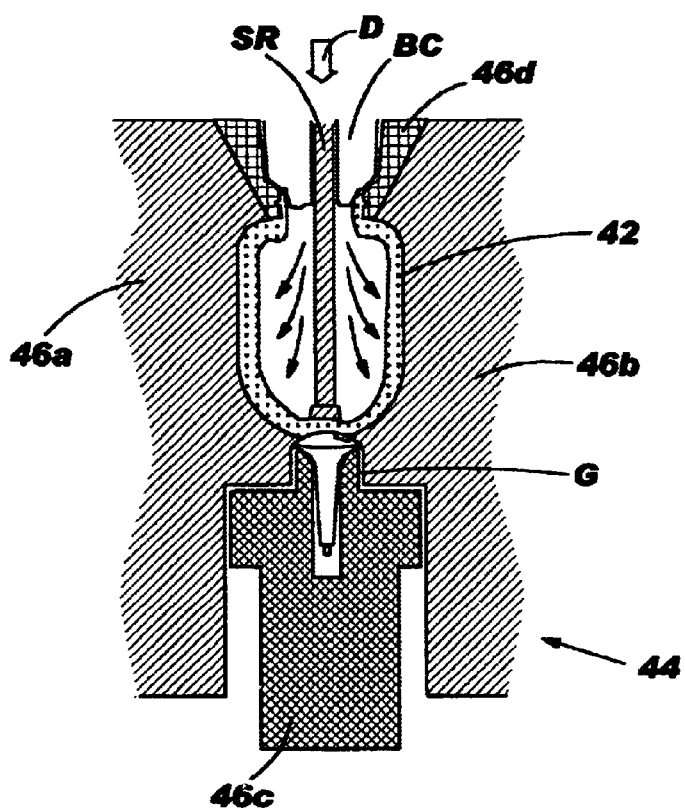

When the preform 40 is in the desired position in or adjacent to the mold 44, the opposing sides 46a and 46b of the mold are brought together over it to create the mold cavity 42 (see action arrows C in FIG. 5b). The blow core BC and/or corresponding stretch rod SR are then moved into an operative position, as illustrated in FIG. 5c. Blow air is then supplied to the preform 40 (which is usually either still relatively warm and pliable from the preceding injection process or else is separately warmed before being placed in the mold cavity 42) at a predetermined pressure and possibly at an elevated temperature simultaneous with the actuation of the stretch rod SR (see action arrow D in FIG. 5c). The pressure supplied by the blow air in combination with the force created by the actuation of the stretch rod SR causes the sides of the preform 40 to biaxially stretch outwardly into the mold cavity 42 to form the body 14 of the container 10 (see the action arrows in FIG. 5c representing the path of the blow air), while the bottom portion generally undergoes only uniaxial stretching. Note also that the fit between the lower portion 46c and the corresponding side portions 46a, 46b of the mold is such that a gap G is created therebetween, which allows any air present in the mold cavity 42 when formed to escape during the biaxial stretching and expansion of the preform 40 during the blow molding operation.

As a result of the biaxial stretching of the sidewalls of the preform 40 and the movement of the stretch rod SR, the bottom portion or wall is forced into engagement, or "smashed," into the first end 16 of the support 12. This causes the bottom portion to penetrate into at least one, and preferably all of the slits 22 and the corresponding bore 24. This not only provides the bottom portion of the now formed hollow body 14 with a surface contour corresponding to the upper surface of the first end 16 of the support 12, but also creates outwardly projecting fingers 50 or embossments in the adjacent underside surface (see FIG. 2). As should be appreciated, the penetration of these fingers 50 into the slits 22 provides an engagement that ultimately prevents the body 14 from rotating relative to the support 12 in the resulting composite container 10.

At the same time, the corresponding bore 24, which as described above forms an undercut, also receives the bottom end portion of the preform 40 carrying the gate mark M (see FIG. 1c) due to the force created by the combined action of the blow air and stretch rod SR. As a result of the undercut and the pliability of the preform 40 prior to and during blow molding, at least part of the upper portion of the plug 52 penetrating into the bore 24 forms a bevel. This bevel ensures that the body 14 remains attached to the support 12 via plug 52 and resists upward movement through the relatively narrow opening of the bore 24. This is perhaps best understood by viewing FIG. 1c, which shows the container 10 in cross-section, in conjunction with FIG. 2, which illustrates the bottom surface contour of the body 14 of the container 10 with the support 12 removed after the blow molding process is complete. As should be appreciated, the bulbous end or lower portion of the plug 52 carrying the gate mark M is juxtaposed to the bottom wall of the bore 24, and as a result is substantially hidden from view in the resulting container 10.

Figure 1C:
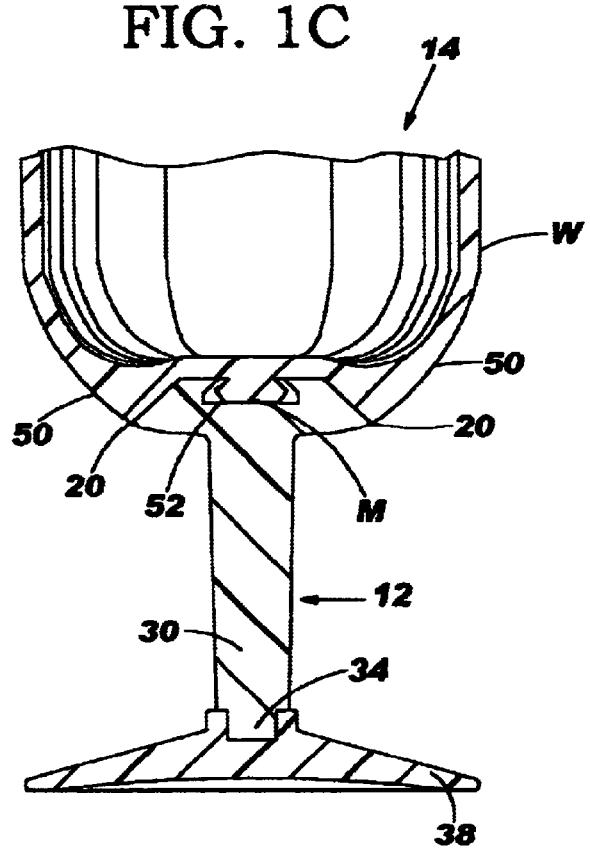
FIG. 1c is an enlarged partially cutaway, cross-sectional side view of the container of FIGS. 1, 1a, and 1b.

Also as a result of the blow molding process, and as perhaps best shown in FIG. 1c as well, a bottom portion of the body 14 blouses over both the sidewall 18 and peripheral ledge 20 of the first end 16 of the support 12 as a result of the biaxial stretching of the sidewalls of the preform 40. The contour of the mold cavity 42 adjacent to the interface between the peripheral ledge 20 and the body 14 is preferably such that a smooth, substantially uninterrupted surface is created around the container 10 at this transition. This may result in the simulated appearance of a container formed of a single piece of material (especially in the case where the color of the support 12 and the body 14 are the same). Hence, once cooled, this bloused portion in combination with the penetration of the other portions of the preform 40 to form the fingers 50 and the plug 52 serves to form a secure bond and otherwise establish an integral connection between the resulting blow molded body 14 and the support 12 to create the container 10.

Figure 5D:
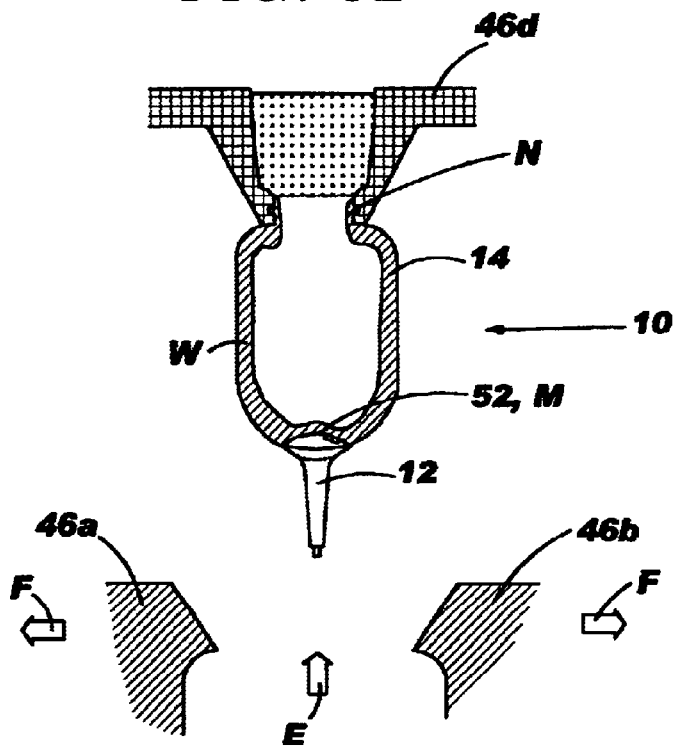

Once the blowing and/or stretching operation is complete, the side portions 46a, 46b of the mold 44 are retracted (see opposing action arrows F in FIG. 5d). Then, the upper portion 46d is moved to allow for the withdrawal of the container 10 with the now-integral support 12 from the mold 44 (see action arrow E in FIG. 5d). This upper portion 46d, which as described above may include the lip cavity, is usually formed in separable halves which are manipulated to release the holding force on the neck N of the resulting container 10.

Figure 6:
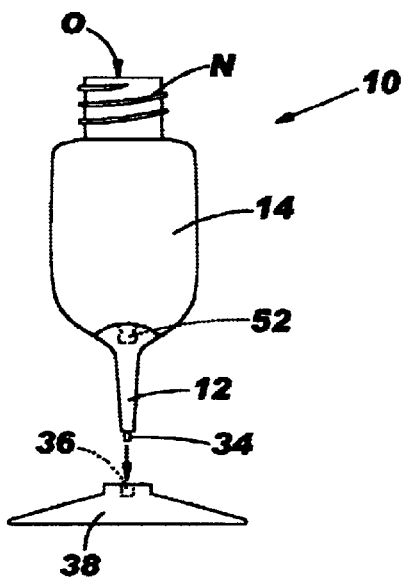
FIG. 6 is a partially exploded side elevational view showing the manner of attaching the base to the support in one possible embodiment of the container.
Figure 7:
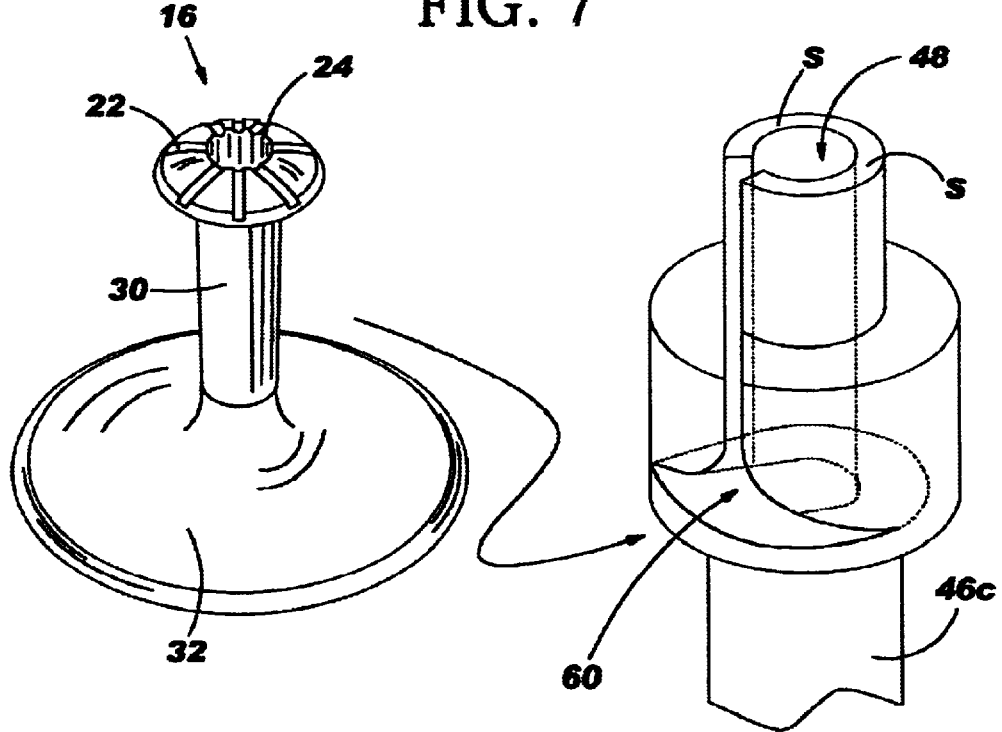
FIG. 7 shows an alternate embodiment of one portion of the mold including a receiver capable of receiving a support having an integral base.

As shown in FIG. 6, a non-integral base 38 may then be attached to the container 10. Specifically, the undercut plug 34 formed on the leg 30 is aligned with and inserted in the socket 36 formed in this base. A suitable adhesive, such as a glue or resin, may be placed in the socket 36 prior to inserting the undercut plug 34 to ensure that a secure and lasting bond is formed therebetween. Once the base 38 is securely in place, the result is a self-supporting composite container 10 formed from an assembly of a body 14 and an integral support 12 or stand created during a blow molding process. As noted above, the base 38 may be plastic formed in a number of possible shapes and sizes using common injection molding techniques.

As mentioned above, in an alternate embodiment, the support 12 may include an integral base 32. In that special case, the receiver 48 formed in a portion of the mold, such as the lower portion 46c, is adapted for receiving the leg 30 as well as the integral base 32. Specifically, the receiver 48 includes an oversized lateral side opening 60. This opening 60 is shaped for receiving both the leg 30 and the integral base 32 (which in the case of the illustrated support 12 is in the shape of an inverted T). A semi-annular tapered support surface S is also provided, as above, to create a surface on which the underside of the first end 16 rests during the blow molding process. Hence, when using a support 12 with an integral base 32, it is necessary to either: (1) release the grip on the neck N of the preform 40 once the molding operation is complete; or (2) withdraw the container 10 laterally through the opening 60 prior to retracting it from the mold. In either case, the result is still an aesthetically pleasing, self-supporting composite container 10 formed of a blow molded body 14 with an integral support 12.

The foregoing description is presented for purposes of illustration and description of the various aspects of the invention. The descriptions are not intended to be exhaustive or to limit the invention to the precise form disclosed. Obvious modifications or variations are possible in light of the above teachings. For instance, it is possible to form the support 12 or the body 14 of the container 10 in any desirable shape. Also, practicing the invention using a parison, rather than a preform 40, is possible. It should also be appreciated that the receiver 48 for receiving the leg 30 of the support 12 could be formed in an outwardly projecting shelf extending from either side portion 46a or 46b of the mold, in which case the opposite side portion would have a corresponding cutout for mating with the portion carrying the receiver 48. Also, instead of slits 22, the openings may comprise grooves, slots, notches, furrows, channels, combinations thereof, and other forms of openings, as long as the particular form chosen is capable of receiving a penetrating portion of the blow molded body of the parison or preform. Stretch blow molding using a stretch rod SR is also shown as a preferred portion of the method only, it being understood that the biaxial stretching and movement of the bottom portion of the preform during the blow molding process may be created as the result of the blow air only, or using other known techniques. The particular technique employed generally depends on the type and thickness of material forming the preform 40, as well as the relative dimensions of the mold cavity 42. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A composite container, comprising:
    a hollow body including a plurality of protrusions in a recess formed in an outer surface thereof;
    a support having a first end with a plurality of slits, each of said slits at least partially receiving at least one of said plurality of protrusions in the recess of said body and a second end; and
    a support structure for engaging the second end of the support;
    wherein each of the plurality of slits extends radially from a common center in the first end of the support and the first end of the support further includes a bore located substantially in the center of said radially extending slits, said bore also receiving at least a portion of the body.

2. The composite container according to claim 1, wherein the first end of the support includes a generally planar surface in which at least a portion of the plurality of slits are formed.

3. The composite container according to claim 2, wherein the first end of the support is frusto-conical and includes a peripheral sidewall having a ledge that engages a second portion of the body that blouses over the planar surface.

4. The composite container according to claim 1, wherein the slits communicate with a sidewall of said bore at one end and a peripheral sidewall of the support at the other end.

5. The composite container according to claim 1, wherein the bore has an opening that is smaller in cross section than a base portion thereof such that an adjacent sidewall is tapered to form an undercut for capturing the portion of the body received therein.

6. The composite container according to claim 1, wherein the support includes a leg having a plug and the support structure is a base having a socket for receiving the plug, whereby the resulting assembly is capable of self-support.

7. A self-supporting composite container, comprising:
    a hollow body having a recess formed in an outer surface thereof;
    a support integrally connected with the body, said support having a first end for engaging a portion of said body and a second end including a leg;
    at least one base mating with the leg to support the body above a stable structure;
    wherein the first end of the support includes a plurality of openings, each comprising a radially extending slit communicating at a first end thereof with a bore and at the opposite end thereof with a peripheral sidewall of said first end of said support, whereby a portion of the body in the recess penetrates at least partially into at least one of the openings to form the integral connection.

8. The composite container according to claim 7, wherein the plurality of openings are selected from the group consisting of grooves, slits, slots, notches, furrows, channels, combinations thereof, and other narrow, elongated openings.

9. The composite container according to claim 7, wherein the first end of the support is frusto-conical and includes a planar surface and a peripheral sidewall including ledge for engaging a portion of the body blousing over the planar surface.

10. The composite container according to claim 7, wherein the base is integrally formed with the leg.

11. A composite container, comprising:
  a hollow blow molded body including a recess formed in an outer surface thereof; and
  a support having a plurality of slits, each extending radially from a common center in the first end of the support, for at least partially receiving a portion of the body in the recess to form an integral connection therewith and a base for supporting the body and support in a generally upright position;
  wherein the first end further includes a bore located substantially in the center of said radially extending slits, said bore also receiving at least a portion of the body.

12. The composite container according to claim 11, wherein the support includes a generally planar first end in which the slits are formed.

13. The composite container according to claim 12, wherein the first end of the support is frusto-conical and includes a peripheral sidewall having a ledge that engages a second portion of the body that blouses over the planar surface.

14. The composite container according to claim 12, wherein the slits communicate with a sidewall of said bore at one end and a peripheral sidewall of the support at the other end.

15. The composite container according to claim 1, wherein the recess in the hollow body has a surface contour corresponding in shape to the first end of the support.

16. The composite container according to claim 1, wherein each protrusion is in the form of a radially extending finger.

17. The composite container according to claim 7, wherein the recess in the hollow body has a surface contour corresponding in shape to the first end of the support.

18. The composite container according to claim 7, wherein the portion of the body in the recess at least partially penetrating into the at least one opening is a radially extending finger.

* * * * *